E. J. F. QUIRIN & G. A. PAYNE.
LEAK ALARM FOR PNEUMATIC TIRES.
APPLICATION FILED JULY 3, 1917.

1,238,567.

Patented Aug. 28, 1917.

Inventors:
E. J. F. Quirin
Geo. A. Payne.
E. W. Anderson
Attorneys.

UNITED STATES PATENT OFFICE.

EMIL J. F. QUIRIN, OF TIOGA CENTER, AND GEORGE A. PAYNE, OF BUFFALO, NEW YORK.

LEAK-ALARM FOR PNEUMATIC TIRES.

1,238,567.   Specification of Letters Patent.   Patented Aug. 28, 1917.

Application filed July 3, 1917. Serial No. 178,511.

*To all whom it may concern:*

Be it known that we, EMIL J. F. QUIRIN, a citizen of the United States, resident of Tioga Center, Tioga county, State of New York, and GEORGE A. PAYNE, a citizen of the United States, resident of Buffalo, in the county of Erie and State of New York, have made a certain new and useful Invention in Leak-Alarms for Pneumatic Tires; and we declare the following to be a full, clear, and exact description of the same, such as will enable others skilled in the art to which it appertains to make and use the invention, reference being had to the accompanying drawings, and to letters or figures of reference marked thereon, which form a part of this specification.

The invention has relation to a device for use in connection with pneumatic tires, designed to give notice to the occupant of an automobile or other vehicle when the tire has become more or less deflated or flattened.

The invention consists in the novel construction and combinations of parts, as hereinafter set forth.

In the accompanying drawings, illustrating the invention, the numeral 2 designates the pneumatic tire, and 3 is the invention, consisting preferably of a ball or sphere of resilient material, as of soft rubber, and provided usually with integral soft rubber circular flanges 4 and 5, each extending entirely around the ball, centrally thereof, and intersecting each other at right-angles.

In use, the rubber ball is placed within the inner tube or air chamber of the tire, the circular flanges or wings 4 and 5 extending outwardly into engagement with the inner walls of said tube or chamber, whereby the ball is prevented from rolling around the tire when the wheel is in rotation, being maintained in one position therein.

The internal diameter of the tire being four inches, the diameter of the ball would be about two inches, and the breadth of each wing about one inch.

In use, should the tire become deflated, the rubber ball will cause the wheel to rise each time the ball is brought around therewith into contact with the ground or roadbed, causing a jar or bump that will give unmistakable notice that the tire is flat. This notice can be given when the tire becomes one-half flat, or flat to any other degree, by increasing the size of the ball and decreasing the width of the wings or flanges.

Figure 1:
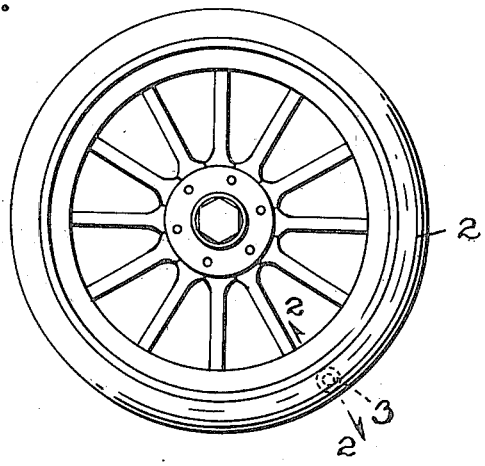
Figure 1 is a side view of a vehicle wheel having the invention (shown in dotted lines) applied thereto.
Figure 2:
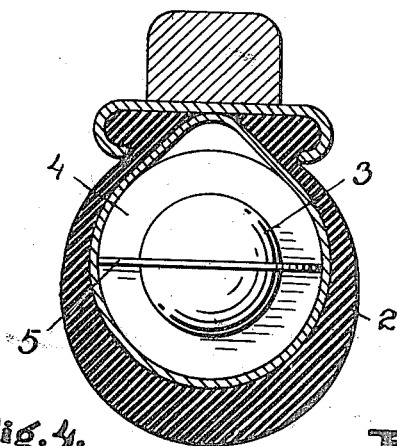
Fig. 2 is a section on the line 2—2, Fig. 1.
Figure 3:
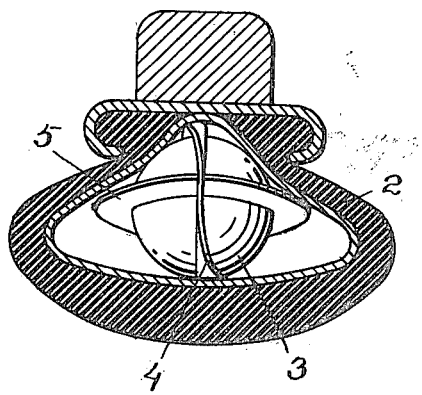
Fig. 3 is a similar view, showing the tire deflated.
Figure 4:
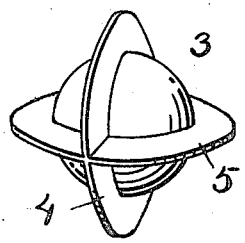
Fig. 4 is a detail perspective view of the invention.
Figure 5:
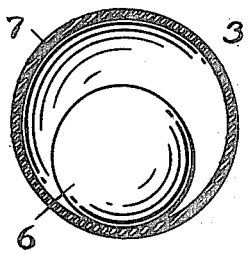
Fig. 5 is a similar view of a modification.

A modification of the invention is shown in Fig. 5 of the drawings, wherein the body of the plug consists of a solid rubber ball 6, said ball located within a hollow rubber ball 7, the latter having an internal diameter greater than the diameter of the solid ball. In this case the outer ball fills the air chamber of the tire with sufficient closeness to maintain it in one position therein when the vehicle wheel is in rotation. Should there be a leak in the tire, and deflation thereof, the resilient walls of the outer ball will yield, and the solid inner ball cause the bump or jar each time the wheel turns around.

Figure 6:
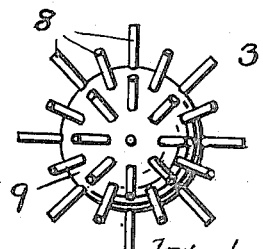
Fig. 6 is a similar view of another modification.

A further modification is shown in Fig. 6, wherein resilient radial projections 8 are provided upon a spherical body 9.

We claim:—

1. A leak alarm for pneumatic tires, consisting of a plug designed to be placed in the inner tube or air chamber of the tire, said plug having an inner main member of a cross-sectional area less than that of said chamber, and an outer resilient member surrounding the inner member and in engagement with the walls of said chamber.

2. A leak alarm for pneumatic tires, consisting of a plug designed to be placed in the inner tube or air chamber of the tire, said plug having an inner main member of a cross-sectional area less than that of said chamber, said member having resilient projections in engagement with the walls of said chamber.

3. A leak alarm for pneumatic tires, consisting of a plug designed to be placed in the inner tube or air chamber of the tire, said plug having a spherical body of a cross sectional area less than that of said chamber, said body having resilient projections in engagement with the walls of said chamber.

4. A leak alarm for pneumatic tires, consisting of a plug designed to be placed in the inner tube or air chamber of the tire, said plug having a spherical body of a cross-sectional area less than that of said chamber, said body having resilient annular intersecting projections in engagement with the walls of said chamber.

In testimony whereof we affix our signatures, in presence of two witnesses.

EMIL J. F. QUIRIN.
GEORGE A. PAYNE.

Witnesses:
A. G. VAN NORSTRAN,
EDWIN LEVITT.